United States Patent [19]

Kizu et al.

[11] Patent Number: 4,600,843
[45] Date of Patent: Jul. 15, 1986

[54] PHOTOELECTRIC CONVERSION APPARATUS

[75] Inventors: Shuji Kizu; Tsuyoshi Ishida, both of Yokohama; Kenichi Hiramatsu, Kawasaki; Junji Miura, Yokohama, all of Japan

[73] Assignee: Tokyo Shibaura Denki Kabushiki Kaisha, Kawasaki, Japan

[21] Appl. No.: 546,191

[22] Filed: Oct. 27, 1983

[30] Foreign Application Priority Data

Nov. 8, 1982 [JP] Japan .................................. 57-195572

[51] Int. Cl.⁴ .............................................. H01J 40/14
[52] U.S. Cl. ...................................... 250/578; 358/213
[58] Field of Search ................ 250/578, 211 J; 358/36, 358/212, 213; 357/30

[56] References Cited

U.S. PATENT DOCUMENTS 4,045,817  8/1977  Nakatani et al. .................... 250/578
4,283,742  8/1981  Izumita et al. ...................... 358/213
4,390,894  6/1983  Raven .................................. 358/36
4,511,804  4/1985  Ozawa ................................ 250/578

Primary Examiner—David C. Nelms
Assistant Examiner—Stephone B. Allen
Attorney, Agent, or Firm—Cushman, Darby & Cushman

[57] ABSTRACT

Analog switches are connected between corresponding photodiodes and a common output line. The analog switches are sequentially scanned in response to scanning pulses. During the ON period of each scanning pulse, the corresponding analog switch is turned on twice. A first circuit produces a first signal, including an image signal component and a noise signal component, when the analog switch is turned on for the first time, and produces a second signal including only the noise signal component, when the analog switch is turned on for the second time. A second circuit produces the signal derived from the difference between the first and second signals, i.e., the image signal.

6 Claims, 4 Drawing Figures

PHOTOELECTRIC CONVERSION APPARATUS

BACKGROUND OF THE INVENTION

The present invention relates to a photoelectric conversion apparatus which includes a plurality of linearly arranged photoelectric conversion elements and is used, for example, as a linear image sensor.

In an optical character reading apparatus or a facsimile apparatus, the linear image sensor used receives reflected light from an object to be read out and converts the incident light into electric signals. The linear image sensor includes a photoelectric conversion element array of a number of linearly arranged photoelectric conversion elements, and a circuit for reading out electric image signals from the respective photoelectric conversion elements. The conventional photoelectric conversion apparatus shown in FIG. 1 includes a photoelectric conversion element array of a number of linearly arranged photoelectric conversion elements, e.g., photodiodes $1_1$ to $1_n$; and a circuit device for sequentially reading out the electric image signals from the respective photodiodes. The circuit device includes a common output line 4; analog switches $3_1$ to $3_n$ which comprise, e.g., MOSFETs, and are respectively connected between the common output line 4 and the photodiodes $1_1$ to $1_n$; and a pulse generating circuit 2 for generating scanning pulses $\phi_1$ to $\phi_n$ and an inhibit pulse $\phi_{IN}$ for use in controlling the ON/OFF operation of the analog switches $3_1$ to $3_n$. The sensor further includes a signal processing circuit which reads out the signals from the photodiodes $1_1$ to $1_n$ onto the common output line 4, and then produces the signals as a video signal 7. The signal processing circuit includes a capacitor $C_V$ connected to the common output line 4 and ground; an analog switch 5 connected between the common output line 4 and ground, the ON/OFF operation which is controlled by a clear pulse $\phi_R$ from the pulse generating circuit 2; and an operational amplifier 6 connected to the common output line 4. If it is assumed that only the photodiodes $1_1$ to $1_5$ are arranged in the apparatus shown in FIG. 1, the timings of the pulses generated by the pulse generating circuit 2 and the timings of the signals read out on the common output line 4 hold the relationship shown in FIG. 2. Referring to FIG. 2, the scanning pulses $\phi_1$ to $\phi_5$ have a pulse width T and sequentially and repeatedly scan the analog switches $3_1$ to $3_5$ (FIGS. 2A to 2E). When the time period for completing one scanning cycle in accordance with scanning pulses $\phi_1$ to $\phi_5$ is defined as a one line scanning time period, each diode stores a charge in response to the project light intensity during this one line scanning time period. For example, to prevent a simultaneous turn-on of analog switches $3_1$ and $3_2$ when scanning pulse $\phi_1$ is switched to scanning pulse $\phi_2$, an inhibit pulse $\phi_{IN}$ (FIG. 2F) which is synchronous with the switching timing from pulse $\phi_1$ to pulse $\phi_2$ is applied to the analog switches $3_1$ to $3_5$. In the time period in which the inhibit pulse is applied, the analog switches $3_1$ to $3_5$ are turned off. When T1 is the rising time of the scanning pulse $\phi_1$, T5 is the falling time thereof, T2 is the falling time of the inhibit pulse $\phi_{IN}$ at time T1, and T4 is the rising time of the inhibit pulse $\phi_{IN}$ corresponding to time T5, the analog switch $3_1$ is turned on from the time T2 to T4. Then, charge from the photodiode $1_1$ is read out onto the common output line 4 from the time T2 to T4. The charge is charged on the capacitor $C_V$ connected to the common output line 4. The charge time constant t of the capacitor $C_V$ is about $0.7 C_V \cdot r$ where r is the ON resistance of the analog switch $3_1$. Since the clear pulse $\phi_R$ rises at the time T3 and the analog switch $3_5$ is turned on, the charge on the capacitor $C_V$ is discharged in the time interval between the times T3 and T5. Then, the operational amplifier 6 produces a video signal 7, i.e., the video signal $e_{S1}$ shown in FIG. 2I, from time T2 to T3. The pulse generating circuit 2 may comprise a shift register, or a counter which receives a start pulse 8 and clock pulses 9. For the sake of simplicity, a description has been made only with reference to pulse $\phi_1$. However, the mode of operation for the other scanning pulses $\phi_2$ to $\phi_5$ remains the same.

The defects of the conventional photoelectric conversion apparatus shown in FIG. 1 will now be described, based on the assumption that the photodiode array only has photodiodes $1_1$ to $1_5$. The common output line 4 receives the noise signal components as well as the image signal components based on charges stored on the photodiodes. The noise signal components are generated due to the turning on and turning off of the analog switches and gate capacitances of the MOS transistors constituting the analog switches. Accordingly, the noise signals differ for the respective analog switches. Thus, even if the photodiodes $1_1$ to $1_5$ are not irradiated with light, that is, even in the dark condition, as long as the analog switches are switched, the operational amplifier 6 produces noise signals $e_{N1}$ to $e_{N5}$, as shown in FIG. 2H. The noise signals have the varied amplitudes shown in FIG. 2H, for the reason given above.

The case wherein uniform light is projected onto the photodiodes $1_1$ to $1_5$, i.e., wherein bright lighting conditions are present, may be described as follows. Under such conditions, the amplitudes of the image signals read out from the photodiodes $1_1$ to $1_5$ must be the same. However, since the corresponding noise signals are added to these image signals, the operational amplifier 6 produces the video signals $e_{S1}$ to $e_{S5}$ shown in FIG. 2I. The ON resistances of the analog switches $3_1$ to $3_5$ change in accordance with the ambient temperature. Accordingly, variations in the video signals are further enhanced. When such noise signals $e_{N1}$ to $e_{N5}$ are generated, the photoelectric reading of, e.g., slips, becomes unreliable, and the processing of slips becomes impossible.

SUMMARY OF THE INVENTION

A primary object of the present invention is to provide a photoelectric conversion apparatus which eliminates noise signals normally generated during the switching of analog switches, and which is capable of producing image signals from photoelectric conversion elements such as video signals.

A photoelectric conversion apparatus according to the present invention comprises an array of photoelectric conversion elements, each of which produces an electric image signal component in response to a projected light; a common output line; a plurality of analog switches, each of which is connected between the common output line and the corresponding photoelectric conversion element; a pulse generating circuit which produces a plurality of scanning pulses, which pulses subsequently scan the analog switches for reading out the electric image signal components on the common output line, in succession, by turning ON each of the analog switches for a predetermined time period; means for turning ON an analog switch during at least a first time period and a second time period, during a predetermined time period in which the analog switch is scanned by a scanning pulse corresponding to the analog switch; first means connected to the common output line and the pulse generating circuit, for use in obtaining a first signal produced during the first time period which first signal includes the image signal component from a photoelectric conversion element and a noise signal component, and for obtaining a second signal produced during the second time period, which second signal includes only the noise signal component; second means connected to the first means and the pulse generating circuit, for holding the first signal for a predetermined time period; and third means connected to the first means and the second means, for producing the image signal component by subtracting the second signal from the first signal.

DETAILED DESCRIPTION OF THE PREFERRED EMBODIMENT

The preferred embodiment of the present invention will now be described with reference to the accompanying drawings.

Figure 1:
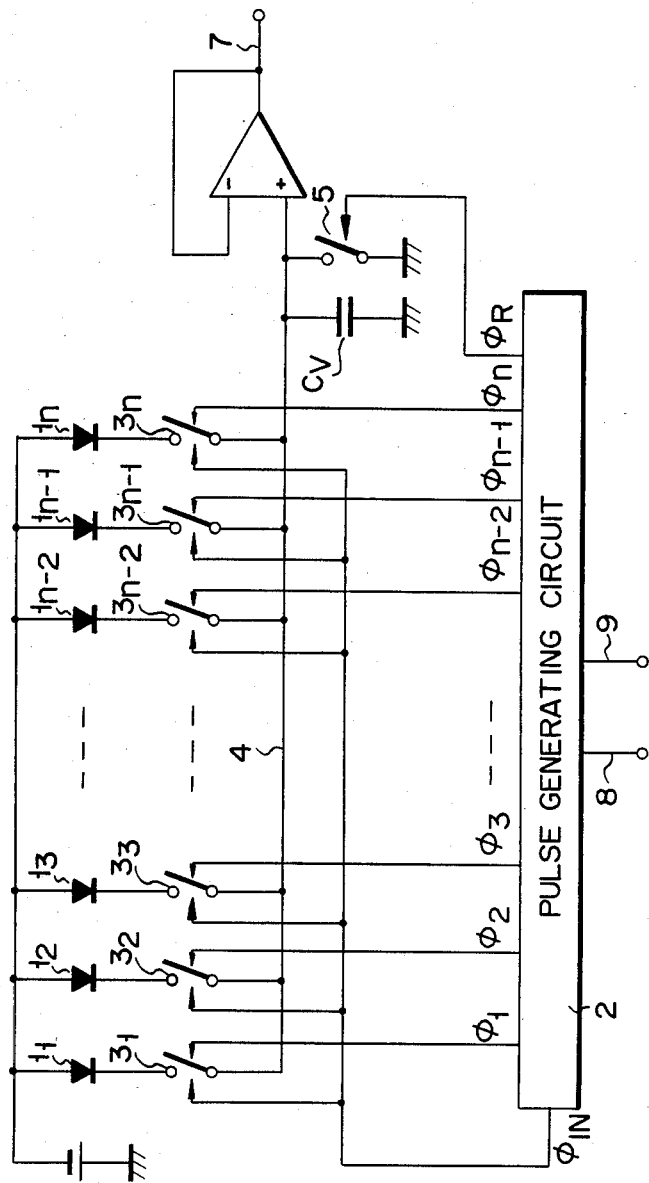
FIG. 1 is a block diagram of a conventional photoelectric conversion apparatus.
Figure 2:
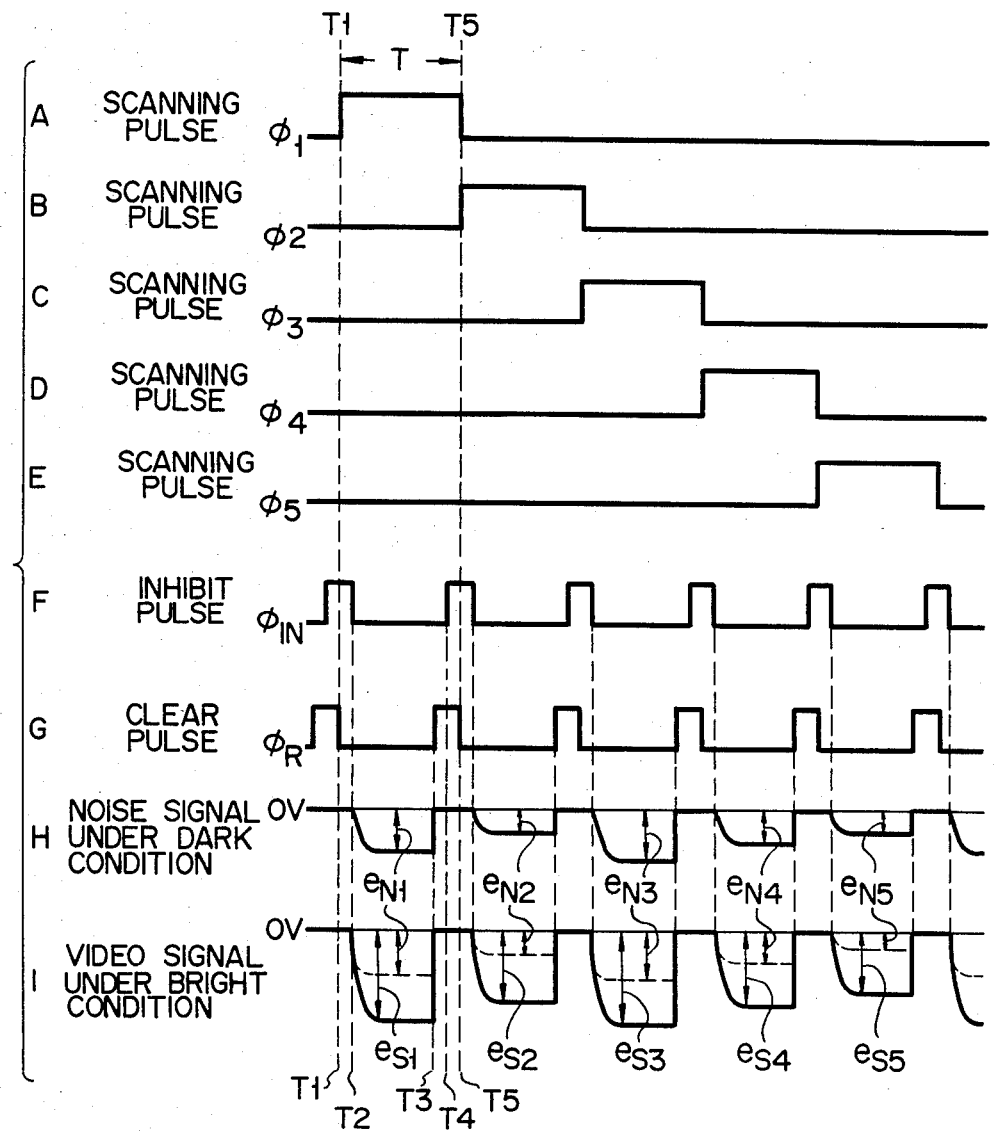
FIG. 2 shows the waveforms used in explaining the mode of operation of the apparatus shown in FIG. 1.
Figure 3:
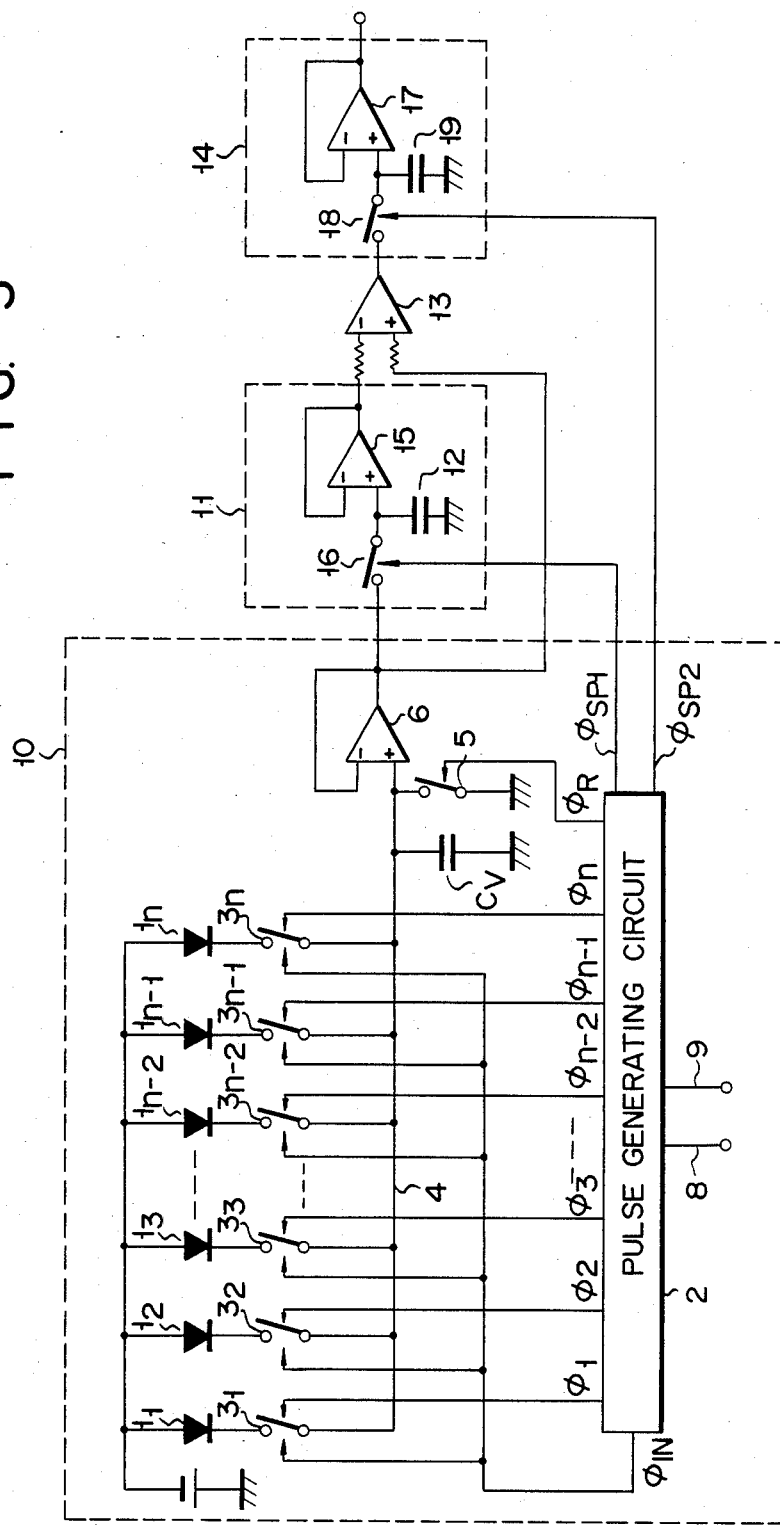
FIG. 3 is a block diagram of a photoelectric conversion apparatus according to an embodiment of the present invention.
Figure 4:
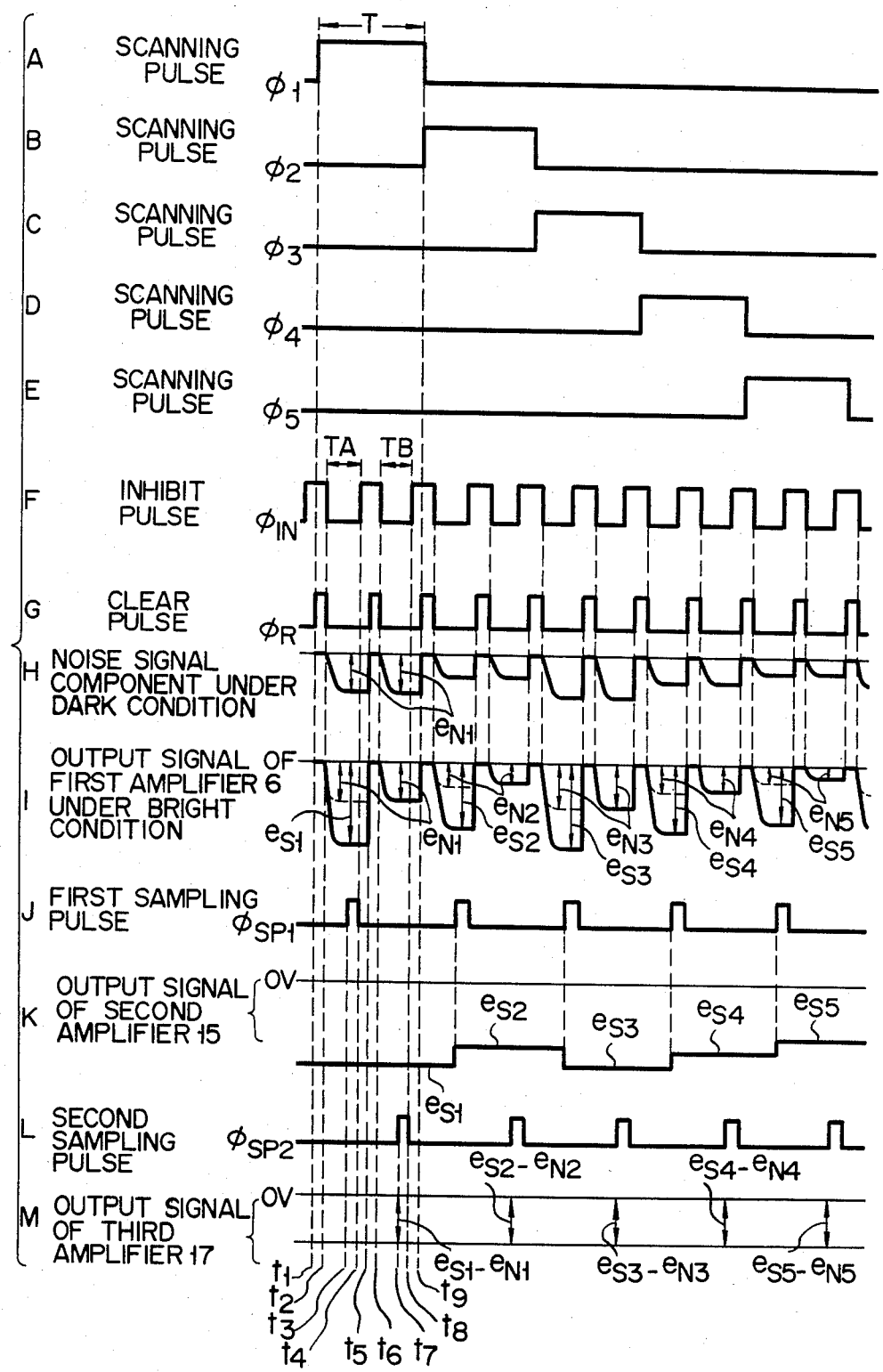
FIG. 4 shows the waveforms used in explaining the mode of operation of the apparatus shown in FIG. 3.

Since the same reference numerals which were used in FIGS. 1 and 2 denote the same parts in FIGS. 3 and 4, a detailed description thereof will be omitted. Referring to FIG. 3, the circuit portion surrounded by a dotted line 10 has substantially the same configuration as that of the apparatus shown in FIG. 1 but differs therefrom in that the frequency of the inhibit pulse $\phi_{IN}$ and the clear pulse $\phi_R$ in FIG. 3 is twice that of the apparatus shown in FIG. 1 and in that the pulse generating circuit 2 generates sampling pulses $\phi_{SP1}$ and $\phi_{SP2}$. The apparatus shown in FIG. 3 further includes a first sample hold circuit 11 connected to the output terminal of the operational amplifier (to be referred to as a first amplifier, hereinafter) 6 and to the output terminal of the pulse generating circuit 2; a differential amplifier 13 which receives an output signal from the first sample hold circuit 11, as well as a noise signal component from the first amplifier 6; and a second sample hold circuit 14 which receives an output signal from the differential amplifier 13 and produces an image signal component such as a video signal. The first sample hold circuit 11 includes a second amplifier 15; an analog switch 16 which is inserted between the positive input terminal of the second amplifier 15 and the output terminal of the first amplifier 6, and which is turned on while it is receiving a sampling pulse $\phi_{SP1}$; and a capacitor 12 connected between the positive input terminal of the second amplifier 15 and ground. The negative input terminal of the second amplifier 15 and the output terminal of the sample hold circuit 11 are connected to each other. The second sample hold circuit 14 includes a third amplifier 17, another analog switch 18 which is inserted between the positive input terminal of the third amplifier 17 and the output terminal of the differential amplifier 13 and which is turned on while it is receiving a sampling pulse $\phi$SP2, and a capacitor 19 which is connected between the positive input terminal of the third amplifier 17 and ground. The negative input terminal of the third amplifier 17 and the output terminal thereof are connected to each other.

FIG. 4 shows the signal waveforms used in explaining the mode of operation of the embodiment shown in FIG. 3 when a photoelectric conversion element array includes elements $1_1$ to $1_5$. As is apparent from FIG. 4, the phase relations of pulses $\phi_{IN}$, $\phi_R$, $\phi_{SP1}$ and $\phi_{SP2}$ corresponding to the scanning pulses $\phi_1$ to $\phi_5$ are the same. The mode of operation of the embodiment shown in FIG. 3 may therefore be described with reference to only a scanning pulse $\phi_1$. The rising time of that scanning pulse $\phi_1$ is designated by t1, its falling time is designated by t9, and its pulse width is designated by T. Times t2 to t8 are sequentially distributed between times t1 and t9. An inhibit pulse $\phi_{IN}$ corresponding to time t1 falls at time t2, and an inhibit pulse $\phi_{IN}$ corresponding to time t9 rises at time t8. An inhibit pulse $\phi_{IN}$ corresponding to a time point substantially intermediate during the time period T rises at time t4 and falls at time t6. Therefore, the analog switch $3_1$ is turned on for a first time period TA between the times t2 and t4 and a second time period TB between the times t6 and t8 (FIG. 4F). A first clear pulse $\phi_R$ supplied to the analog switch $3_1$ rises at time t1 and falls at time t2. A second clear pulse $\phi_R$ rises at time t5 and falls at time t6. Therefore, in the dark conditions (light is not projected onto the photodiode $1_1$), the first amplifier 6 produces a noise signal component $e_{N1}$ from the time t2 to t5 and from the time t6 to t9 (FIG. 4H). Under bright conditions (wherein light is projected onto photodiode $1_1$), the first amplifier 6 produces a first signal $e_{S1}$ from time t2 to t5, and a second signal $e_{N1}$ from time t6 to t9. The second signal $e_{N1}$ includes only the noise signal component $e_{N1}$. The first signal $e_{S1}$ includes an image signal component corresponding to the amount of charge stored in the photodiode $1_1$, and a noise signal component $e_{N1}$, as well. The second signal $e_{N1}$ includes only the noise signal component $e_{N1}$, since the charge stored in the photodiode $1_1$ is practically discharged in time interval TA. The pulse width of the sampling pulse $\phi_{SP1}$ is from time t3 to t4 (FIG. 4J). Therefore, the first signal $e_{S1}$ is sampled and is stored on the capacitor 12 while the analog switch 16 is turned on from time t3 to t4. The output level of the second amplifier 15 is given as $e_{S1}$, as shown in FIG. 4K. More specifically, the output level from the second amplifier 15 is kept at the level of the first signal $e_{S1}$ until the rising time of the sampling pulse $\phi_{SP1}$ corresponding to the scanning pulse $\phi_2$ (FIG. 4K). In the period in which the first signal $e_{S1}$ shown in FIG. 4K is supplied to the negative input terminal of the differential amplifier 13, the noise signal component $e_{N1}$ is supplied from the output terminal of the first amplifier 6 to the positive input terminal of the differential amplifier 13 from time t6 to t9. Therefore, the differential amplifier 13 produces a signal $e_{S1}-e_{N1}$, i.e., an image signal from the photodiode $1_1$, which signal does not contain the noise signal component $e_{N1}$. This image signal is charged on the capacitor 19, through the analog switch 18, by a sampling pulse $\phi_{SP2}$ (FIG. 2L) having a pulse width of from T7 to T8. As a result, the image signal $e_{S1}-e_{N1}$ is produced as a video signal $e_{S1}-e_{N1}$ from the third amplifier 14 (FIG. 4M).

For the sake of clarity, a description has been made of the case wherein a video signal $e_{S1}-e_{N1}$ corresponding to the image signal from the photodiode $1_1$ is obtained in correspondence with the scanning pulse $\phi_1$. However, as may readily be seen from FIG. 4, video signals $e_{S2}-e_{N2}$; $e_{S3}-e_{N3}$; $e_{S4}-e_{N4}$; $e_{S5}-e_{N5}$ which represent the image signals from the photodiodes $3_2$ to $3_5$ can also be obtained corresponding to the scanning pulses $\phi_2$ to $\phi_5$. When it is assumed that uniform light is projected onto the photodiodes $1_1$ to $1_n$, the amplitudes of the resultant video signals become uniform, as shown in FIG. 4M.

As may be seen from the above description, in a conventional photoelectric conversion apparatus, it is difficult to eliminate the noise signal components from the video signals, these components being introduced as a result of the difference between the ON resistances of the analog switches, the difference between the gate capacitances of the MOS transistors constituting the analog switches, etc. By way of contrast, video signals from which the noise signals have been eliminated can be obtained in the present invention.

What is claimed is:

1. A photoelectric conversion apparatus comprising:
an array of photoelectric conversion elements, each of which produces an electric image signal component in response to a projected light;
a common output line;
a plurality of analog switches, each of which is connected between said common output line and the corresponding photoelectric conversion element;
a pulse generating circuit which produces a plurality of scanning pulses, which pulses subsequently scan said analog switches, for reading out said image signal components on said common output line, in succession, by turning ON each of said analog switches for a predetermined time period;
means for turning ON an analog switch during at least a first time period and a second time period which are equal in duration, during a predetermined time period in which said analog switch is scanned by a scanning pulse corresponding to said analog switch;
first means connected to said common output line and said pulse generating circuit, for use in obtaining a first signal produced during said first time period, which first signal includes said image signal component from a photoelectric element and a noise signal component, and for obtaining a second signal produced during said second time period, which second signal includes only said noise signal component;
second means connected to said first means and said pulse generating circuit, for holding said first signal for a predetermined time period; and
third means connected to said first means and said second means, for producing said image signal component by subtracting said second signal from said first signal.

2. A photoelectric conversion apparatus according to claim 1, wherein said photoelectric conversion apparatus further comprises fourth means connected to said third means and said pulse generating circuit, for sampling said image signal component and preserving the sampled value for a predetermined time period in obtaining a video signal.

3. A photoelectric conversion apparatus according to claim 1, wherein said first means comprises a capacitor connected between said common output line and ground; a first amplifier which is connected at one input terminal to said common output line and at the other input terminal to the output termainal thereof; and an analog switch connected between said common output line and ground; a clear pulse from said pulse generating circuit controlling said analog switch in such a way that said first amplifier produces said first signal and said second signal at separate timings.

4. A photoelectric conversion apparatus according to claim 1, wherein said second means comprises an amplifier which is connected at one input terminal to the output terminal of said first means, through an analog switch, and at the other input terminal to the output thereof; and a capacitor connected between said one input terminal and ground; a first sampling pulse from said pulse generating circuit controlling said analog switch in such a way that said second means holds the first signal for a predetermined time period.

5. A photoelectric conversion apparatus according to claim 1, wherein said third means comprises a differential amplifier which is connected at one input terminal to the output terminal of said first means, and at the other input terminal to the output terminal of said second means; said differential amplifier producing an image signal which is produced by subtracting a second signal supplied from said first means from a first signal supplied from said second means.

6. A photoelectric conversion apparatus according to claim 2, wherein said fourth means comprises an amplifier which is connected at one input terminal to the output terminal of said third means, through an analog switch, and at the other input terminal to the output terminal thereof; and a capcitor connected between the one input terminal said amplifier of said fourth means and ground; a second sampling pulse from said pulse generating circuit controlling said fourth means in such a way that said fourth means samples said image signal component from said thrid means, preserving the sampled signal for a predetermined time period, in producing a video signal.

* * * * *